United States Patent
Nakata et al.

[11] Patent Number: 6,100,366
[45] Date of Patent: Aug. 8, 2000

[54] CYCLIC IMINO ETHER GROUP CONTAINING POLYMER AND PRODUCTION PROCESS THEREFOR

[75] Inventors: Yoshitomo Nakata, Nishinomiya; Kazumi Fujioka, Ibo-gun, both of Japan

[73] Assignee: Nippon Shokubai Co., Ltd., Osaka, Japan

[21] Appl. No.: 09/382,404

[22] Filed: Aug. 24, 1999

[30] Foreign Application Priority Data

Sep. 18, 1998 [JP] Japan .................................. 10-264171

[51] Int. Cl.[7] .......................... C08G 73/00; C08G 69/00; C08F 122/40; C08F 283/00
[52] U.S. Cl. ............................ 528/170; 526/262; 525/73; 525/205; 528/327
[58] Field of Search ..................... 525/73, 205; 526/262; 528/170, 327

[56] References Cited

U.S. PATENT DOCUMENTS

| | | | |
|---|---|---|---|
| 4,686,279 | 8/1987 | Nagtzaam et al. | 528/501 |
| 5,191,046 | 3/1993 | Iwamoto et al. | 526/262 |
| 5,559,187 | 9/1996 | Maeda et al. | 525/173 |

FOREIGN PATENT DOCUMENTS

| | | |
|---|---|---|
| 50-40687 | 4/1975 | Japan . |
| 50-40688 | 4/1975 | Japan . |
| 57-49603 | 3/1982 | Japan . |
| 57-135814 | 8/1982 | Japan . |
| 58-162616 | 9/1983 | Japan . |
| 59-58006 | 4/1984 | Japan . |
| 59-126411 | 7/1984 | Japan . |
| 61-276807 | 12/1986 | Japan . |
| 62-129334 | 6/1987 | Japan . |
| 63-147501 | 6/1988 | Japan . |
| 3-49925 | 3/1991 | Japan . |
| 3-205411 | 9/1991 | Japan . |
| 1 467 045 | 3/1977 | United Kingdom . |

Primary Examiner—P. Hampton-Hightower

[57] ABSTRACT

The present invention provides: a cyclic imino ether group containing polymer with an extremely reduced amount of residual cyclic imino ether group containing monomer; and a production process therefor. The cyclic imino ether group containing polymer is obtained by a process including the step of polymerizing a monomer component including a cyclic imino ether group containing monomer, and contains a cyclic imino ether group containing monomer unit in the ratio of not less than 0.1 mol %, wherein the amount of the cyclic imino ether group containing monomer remaining in the polymer is not more than 15 ppm. The production process for a cyclic imino ether group containing polymer comprises the steps of: radical-polymerizing a monomer component including a cyclic imino ether group containing monomer to obtain a cyclic imino ether group containing polymer; devolatilizing the resultant polymer by vacuum heating treatment to remove volatile components from the polymer; and adding a compound, reactable with the cyclic imino ether group, to the polymer in the devolatilizing step.

4 Claims, 1 Drawing Sheet

CYCLIC IMINO ETHER GROUP CONTAINING POLYMER AND PRODUCTION PROCESS THEREFOR

BACKGROUND OF THE INVENTION

A. Technical Field

The present invention relates to a cyclic imino ether group containing polymer and a production process therefor.

B. Background Art

Cyclic imino ether group containing polymers, as formed by introducing cyclic imino ether groups, such as oxazoline group, into part of side chains of polymers, such as polystyrene, poly(styrene-acrylonitrile), and poly(methyl methacrylate), are in practical use, for example, as high-molecular crosslinking agents and high-molecular compatibilizers, by utilizing high reactivity of the cyclic imino ether group.

The cyclic imino ether group containing polymer is mainly produced by a process including the step of radical-polymerizing a cyclic imino ether group containing monomer and other monomers. Solution polymerization gives the cyclic imino ether group containing polymer in a dissolved state, and suspension polymerization gives the cyclic imino ether group containing polymer in a dispersed state. Therefore, there is need to separate, thereby, remove, volatile components, such as solvents, unreacted monomers, and volatile by-products, from these states. For example, there are proposed processes in which: the reaction liquid containing the polymer resultant from the polymerization is added to a solvent which dissolves volatile components, but does not dissolve the polymer, thus extracting the volatile components to remove them (JP-A-162616/1983); the volatile components are evaporated with a flash evaporator, and the polymer as left behind is extracted in a melted state (JP-A-276807/1986, JP-A-129334/1987, and JP-A-205411/1991); the volatile components are removed by supplying the reaction liquid containing the polymer, resultant from the polymerization, to a screw type devolatilizing extruder directly or after preheat-drying the reaction liquid, (JP-A-126411/1984, JP-A-058006/1984, JP-A-135814/1982, JP-A-040687/1975, JP-A-040688/1975, JP-A-049603/1982, JP-A-147501/1988, and JP-A-049925/1991).

Some of the above processes are practically employed as industrial processes as well, and it has so far been thought that the amount of volatile components could sufficiently be reduced by those processes to such an extent that there is practically no problem. Such a thought was caused by that when the amount of volatile components was extremely small there was no means to quantify it, and further by that the recognition or regulation to the amount of residual volatile components were therefore looser than the current ones.

However, in recent years, environmental problems are being regarded as more and more important, and further, means for analysis have advanced so much as to enable even the quantification of a small amount of residue which has so far been "below the detection limit." Thus, cases where the conventional amount of residue is regarded as a problem have got to occur. As to cyclic imino ether group containing monomers having particularly strong toxicity among the volatile components, more reduction of the amount of the residue thereof has got to be demanded.

SUMMARY OF THE INVENTION

A. OBJECTS OF THE INVENTION

Thus, an object of the present invention is to provide: a cyclic imino ether group containing polymer with an extremely reduced amount of residual cyclic imino ether group containing monomer; and a production process therefor.

B. DISCLOSURE OF THE INVENTION

To solve the above problems, the present invention provides the following constitution:

(1) A cyclic imino ether group containing polymer, which is obtained by a process including the step of polymerizing a monomer component including a cyclic imino ether group containing monomer, and contains a cyclic imino ether group containing monomer unit in the ratio of not less than 0.1 mol %, with the polymer being characterized in that the amount of the cyclic imino ether group containing monomer remaining in the polymer is not more than 15 ppm.

(2) A production process for a cyclic imino ether group containing polymer, comprising the steps of: radical-polymerizing a monomer component including a cyclic imino ether group containing monomer to obtain a cyclic imino ether group containing polymer; and devolatilizing the resultant polymer by vacuum heating treatment to remove volatile components from the polymer, with the process being characterized by further comprising the step of adding a compound, reactable with the cyclic imino ether group, to the polymer in the devolatilizing step.

In the present invention, the "devolatilization to remove volatile components by vacuum heating treatment," which is the most efficient, is employed as the means to reduce the amount of residual cyclic imino ether group containing monomer, and has been more improved. As to the means to reduce the amount of residual monomer, for example, a process involving endless purification might be thought of, but its effect is not high for the consumption of the cost and time, so it is difficult to say that such a process is an industrially excellent process. That is to say, in the present invention, the amount of residual cyclic imino ether group containing monomer can particularly be reduced in a simple way where a compound reactable with the cyclic imino ether group is added to the polymer in the devolatilizing step to remove volatile components from the polymer by vacuum heating treatment.

These and other objects and the advantages of the present invention will be more fully apart from the following detailed disclosure.

Figure 1:
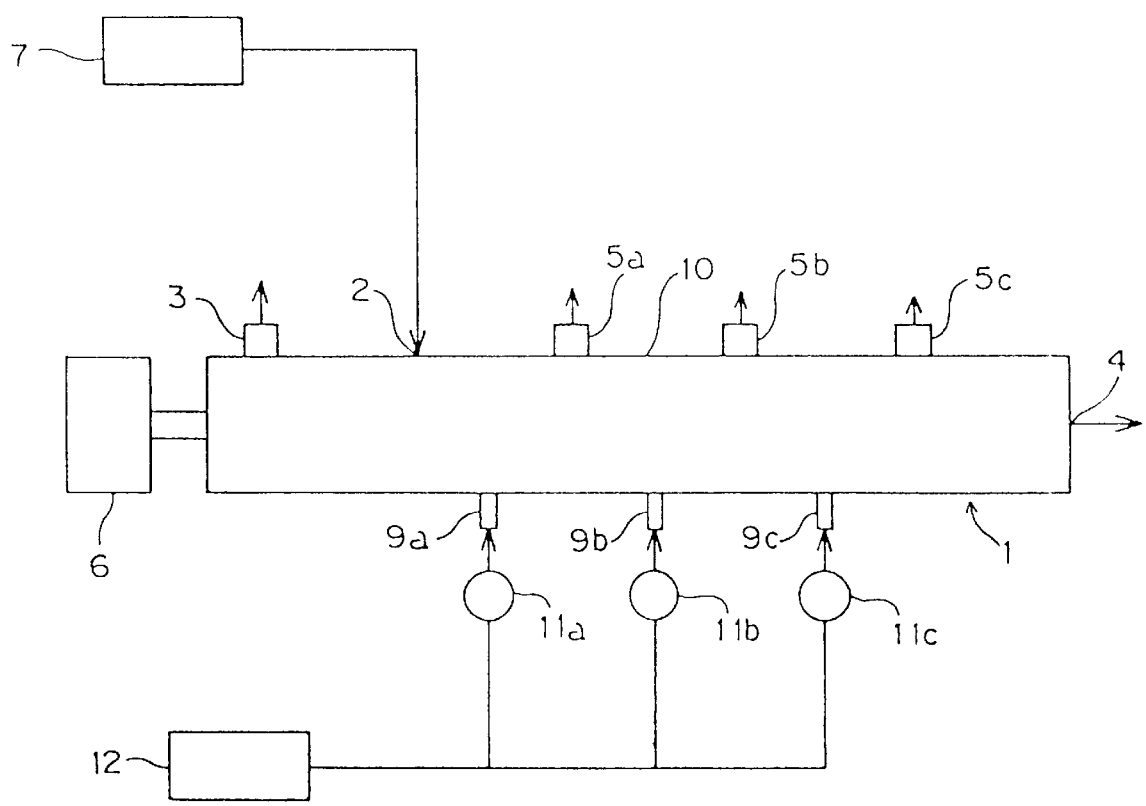
FIG. 1 is an outline of an example of screw extruders usable in the present invention.

(Explanation of the Symbols):

1: Vent type screw extruder

2: Supply part

3: Rear vent

4: Polymer outlet

5a~5c: Fore vents

6: Screw-driving part

7: Raw material reservoir

9a~9c: Injection inlets

10: Cylinder

11a~11c: Pressure-regulating valves

12: Supply source

DETAILED DESCRIPTION OF THE INVENTION

Hereinafter, the present invention is explained in more detail.

In the present invention, the cyclic imino ether group containing monomer is a compound having a cyclic imino ether group and a polymerizable vinyl group, and is specifically shown by general formula (1) below:

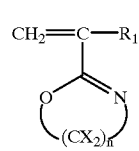

(1)

wherein: $R_1$ denotes a hydrogen atom or an alkyl group;
X independently denotes a hydrogen atom or a hydrocarbon group with not more than 18 carbon atoms; and
n denotes an integer of 1 to 5.

Monomers containing an oxazoline group of n=2 are preferable for good copolymerizability among the cyclic imino ether group containing monomers of general formula (1) above. Specific examples of such preferable monomers include 2-vinyl-2-oxazoline, 5-methyl-2-vinyl-2-oxazoline, 4,4-dimethyl-2-vinyl-2-oxazoline, 4,4-dimethyl-2-vinyl-5, 5-dihydro-4H-1,3-oxazoline, 2-isopropenyl-2-oxazoline, and 4,4-dimethyl-2-isopropenyl-2-oxazoline. Particularly, 2-isopropenyl-2-oxazoline of general formula (2) below and 4,4-dimethyl-2-isopropenyl-2-oxazoline of general formula (3) below are preferable, because they are easily obtainable and have good copolymerizability.

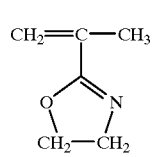

(2)

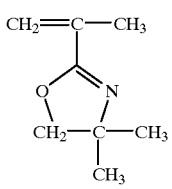

(3)

In the present invention, if necessary, the monomer component may further include other monomers copolymerizable with the cyclic imino ether group containing monomer. Examples of such other monomers include unsaturated alkyl carboxylate monomers, aromatic vinyl monomers, and vinyl cyanide monomers. These other monomers may be used either alone respectively or in combinations with each other.

Examples of the unsaturated alkyl carboxylate monomer include methyl (meth)acrylate, ethyl (meth)acrylate, propyl (meth)acrylate, n-butyl (meth)acrylate, iso-butyl (meth) acrylate, t-butyl (meth)acrylate, 2-ethylhexyl (meth) acrylate, n-octyl (meth)acrylate, iso-nonyl (meth)acrylate, dodecyl (meth)acrylate, and stearyl (meth)acrylate. Among them, aliphatic alkyl (meth)acrylates are preferable, and methyl (meth)acrylate is particularly preferable.

Examples of the aromatic vinyl monomer include styrene and α-methyl styrene. Among them, particularly, styrene is preferable.

Examples of the vinyl cyanide monomer include acrylonitrile and methacrylonitrile. Among them, particularly, acrylonitrile is preferable.

The ratio of the cyclic imino ether group containing monomer in the monomer component, as used, is not especially limited. However, because the resultant polymer preferably contains a cyclic imino ether group containing monomer unit in the ratio of not less than 0.1 mol %, the ratio of the cyclic imino ether group containing monomer in the monomer component is also preferably not less than 0.1 mol %, and more preferably in the range of 0.1~50 mol %, still more preferably 1~30 mol%.

The method to radical-polymerizing the monomer component including the cyclic imino ether group containing monomer is not especially limited, and any of solution polymerization, bulk polymerization, suspension polymerization, and emulsion polymerization is available.

Examples of solvents, as used for the solution polymerization, include: aromatic hydrocarbons, such as toluene, xylene, and ethylbenzene; acetate esters, such as ethyl acetate and butyl acetate; ketones, such as methyl ethyl ketone and methyl isobutyl ketone; aliphatic alcohols, such as iso-butanol; and alkylene glycol monoalkyl ethers, such as ethylene glycol monomethyl ether, ethylene glycol monoethyl ether, and diethylene glycol monoethyl ether. However, there is no especial limitation. These solvents may be used either alone respectively or in combinations with each other.

In addition, when radical-polymerizing the monomer component, the polymerization initiator can be used. Examples of the polymerization initiator include radical polymerization initiators such as azobisisobutyronitrile, benzoyl peroxide, and di-t-butyl peroxide, but there is no especial limitation.

The above radical polymerization gives a cyclic imino ether group containing polymer that includes volatile components. The volatile components are those which are included in raw materials and those which are formed by side reactions. Examples thereof include solvents, unreacted monomers, and volatile by-products. The amount of the volatile components is usually in the range of about 10 to about 80 weight %, preferably about 20 to about 60 weight %, of the total of the cyclic imino ether group containing polymer and the volatile components.

In the present invention, it is important to add a compound, reactable with the cyclic imino ether group, to the polymer in the devolatilizing step of removing the volatile components by vacuum heating treatment after obtaining the polymer. This addition can reduce the amount of residual cyclic imino ether group containing monomer particularly among the volatile components. In the case where the above compound is volatile at the devolatilizing temperature, there are more advantages in that such a compound remains in the resultant products little, or in that excessive reactions occur little.

Examples of the compound reactable with the cyclic imino ether group include: water; carboxyl group containing compounds (e.g. aliphatic carboxylic acids, such as acetic acid, propionic acid, and valeric acid; and aromatic carboxylic acids, such as benzoic acid); phenolic hydroxyl group containing compounds (e.g. phenol, cresol, naphthol); and thiol group containing compounds (e.g. ethylmercaptan, benzenethiol). These compounds are preferable, because they are volatile at the devolatilizing temperature, and water is the most preferable of them. Under conditions such as devolatilizing conditions in the present invention, water selectively reacts with a cyclic imino ether group structure moiety of the cyclic imino ether group containing monomer, but is difficult to react with the cyclic imino ether group of the cyclic imino ether group containing polymer that is present in the system. In other words, water is a compound that does substantially not react with the cyclic imino ether group of the cyclic imino ether group containing polymer that is present in the system. Therefore, the addition of water is a preferable mode for carrying out the present invention production process.

The above compound reactable with the cyclic imino ether group may be added so that it would be added and mixed into the polymer prior to the step of separating volatile components by vacuum operation, and then separated under vacuum. These operations can be carried out in a batch or continuous manner. Particularly, it is efficient to continuously carry out these operations with an extruder. In such a case, if the compound, reactable with the cyclic imino ether group, is added in the devolatilizing step, specifically, if this compound is added through an injection inlet as made between a raw material inlet and a product outlet of the extruder, then there are especial advantages in that the added compound or reaction products therefrom are removed by volatilization through vents and therefore do not mingle into solvents or unreacted monomers which are to be recovered and recycled, so operations become facilitated.

As to the compound reactable with the cyclic imino ether group, a liquid one may be added in the form of remaining a liquid, and a solid one is preferably added in a state where dissolved or dispersed in a liquid. This liquid, as used, is not especially limited if it does not react with the above solid, and further, this liquid may be either reactable or unreactable with the cyclic imino ether group.

The amount of the compound reactable with the cyclic imino ether group, as added, is preferably in the range of 0.01~10 weight %, more preferably 0.1~2 weight %, of the polymer. In the case where the amount is smaller than 0.01 weight %, the effect of the addition is little. In the case where the amount exceeds 10 weight %, intense foaming occurs, so it is difficult to stably carry out the devolatilizing operation.

In addition, to promote the reaction, a catalyst may be added along with the above compound reactable with the cyclic imino ether group. For example, to promote the hydrolysis with water, an aqueous solution of a strong acid compound may be added. Examples of the strong acid compound include sulfuric acid, nitric acid, hydrochloric acid, toluenesulfonic acid, phosphoric acid, and phosphorous acid.

Examples of devolatilizing machines, usable for the devolatilization in the present invention, include vent type screw extruders, thin-membrane evaporators, and flash evaporators. The vent type screw extruders are preferable in respect to high devolatilizability.

An outline of a vent type screw extruder, as preferably used in the present invention, is shown in FIG. 1. This vent type screw extruder has a single or more multiple screw. Those which have a double screw are preferable, because they are efficient and easily available.

The vent type screw extruder 1 has a cylinder 10. This cylinder 10 usually comprises at least two parts (barrels). Vents are made on the side of the cylinder 10. The vents comprise a rear vent 3, as made in the rear of a raw material supply part 2, and at least two vents, for example, two to five fore vents (in this figure, three fore vents 5a, 5b, 5c) as made in front of the supply part 2. In the case where the number of the fore vents is one, the removal efficiency of the volatile components might be low. Even though not less than six fore vents are used, the removal efficiency is often unchanged. If the exhaust pressure is gradually decreased as the devolatilization of raw materials advances, then there are advantages in that the devolatilization ratio is largely improved. The pressure at the rear vent 3 is preferably in the range of 300~760 mmHg, and the pressure at the vent 5c in the vicinity of the polymer outlet 4 is preferably not higher than 600 mmHg, and more preferably not higher than 400 mmHg. The exhaust may be made in such a manner that the pressures at the vent parts would be their respective predetermined values with a vacuum pump. In FIG. 1, the number 6 denotes a screw-driving part, and the number 7 denotes a raw material reservoir.

In the present invention, the method for adding the compound reactable with the cyclic imino ether group is not especially limited, but, as can be understood from the above description, in a preferable method, the compound is injected through injection inlets 9 . . . as opened in the area where the fore vents are made. Each injection inlet 9 is preferably connected to a supply source 12 through a back pressure valve 11 as a pressure-regulating valve.

The cylinder temperature of the extruder is preferably in the range of 160~320° C., more preferably 200~300° C. In the case where the cylinder temperature is below 160° C., the volatile components cannot efficiently be removed. In the case where the cylinder temperature exceeds 320° C., the deterioration of the polymer might be caused.

The production process, as explained above, can give the present invention cyclic imino ether group containing polymer. That is to say, the resultant polymer contains a cyclic imino ether group containing monomer unit in the ratio of not less than 0.1 mol %, and is characterized in that the amount of the cyclic imino ether group containing monomer remaining in the polymer is not more than 15 ppm, preferably not more than 10 ppm, more preferably not more than 5 ppm.

The ratio of the cyclic imino ether group containing monomer unit in the polymer is not less than 0.1 mol %, and preferably in the range of 0.1~50 mol %, more preferably 1~30 mol %, still more preferably 1~20 mol %, most preferably 1~10 mol %. In the case where the ratio of the cyclic imino ether group containing monomer as used is less than 0.1 mol %, the polymer can be given no feature as derived from the cyclic imino ether group. On the other hand, in the case where the ratio of the cyclic imino ether group containing monomer as used exceeds 50 mol %, the resultant processability or moldability might be low.

The amount of the cyclic imino ether group containing monomer remaining in the polymer can be measured by gas chromatography (GC).

The weight-average molecular weight of the present invention cyclic imino ether group containing polymer is preferably in the range of 1,000~1,000,000, more preferably 5,000~500,000.

As is mentioned above, the present invention cyclic imino ether group containing polymer merely involves an extremely small amount of residual cyclic imino ether group containing monomer. Of course, it is preferable that the amount of other residual volatile components is also small. Specifically, when solvents are included the residue thereof is preferably not more than 500 ppm, and when unreacted monomers are included the residue thereof is preferably not more than 500 ppm. In addition, the total of these volatile components is preferably not more than 1,000 ppm.

The present invention cyclic imino ether group containing polymer, for example, can be utilized as a high-molecular crosslinking agent and a high-molecular compatibilizer by making use of high reactivity of the cyclic imino ether group. (Effects and Advantages of the Invention):

The present invention can give a cyclic imino ether group containing polymer with an extremely reduced amount of residual cyclic imino ether group containing monomer.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited thereto.

In the examples, unless otherwise noted, the units "part(s)" and "%" are by weight.

(1) Measurement of Amount of Residual Volatile Components:

As carried out by gas chromatography (GC).

Specifically, a glass column of 2 m in length containing a filler PEG6000+KOH 10+10% (made by Shimadzu Corporation) was used. As to the temperature conditions, the injection part temperature was 150° C., the detection part temperature was 200° C., and the column temperature was maintained at 60° C. for 10 minutes and then raised up to 82° C. at a rate of 8° C./min and then maintained at this temperature for 20 minutes. FID was used as the detector, and nitrogen gas was used as the carrier gas at a flow rate of 50 ml/min.

The respective weights of the polymer pellets, as obtained in the Examples and the Comparative Examples, were increased to about 10 times by dissolving them into THF (tetrahydrofuran), thus obtaining samples, 10 gl of which was injected into a GC apparatus with a microsyringe to carry out the measurement. In the measurement by this method, the detection limit of the cyclic imino ether group containing monomer remaining in the polymer was 5 ppm.

(2) Quantification of Content of Cyclic Imino Ether Group Containing Monomer Unit in Polymer:

A calibration curve was drawn from the absorption intensity of infrared absorption spectra (IR) to determine the oxazoline group content and the benzene ring content in the polymer, wherein the oxazoline group is derived from 2-isopropenyl-2-oxazoline and has absorption at the wave number of 1655 $cm^{-1}$, and wherein the benzene ring is derived from styrene and has absorption at the wave number of 1600 $cm^{-1}$.

EXAMPLE 1

A polymer solution with a solid content of 42% was obtained by polymerizing 95 parts of styrene and 5 parts of 2-isopropenyl-2-oxazoline in 100 parts of toluene as the solvent by conventional solution polymerization.

The resultant polymer solution was devolatilized by allowing it to pass through a pressure-reduced vent type double-screw extruder of FIG. 1 while ion-exchanged water was injected with a diaphragm proportioning pump from the injection inlet 9 as formed on the way of the extruder. The polymer, as discharged from the outlet of the extruder, was pelletized with a pelletizer, thus obtaining colorless transparent polymer pellets with a weight-average molecular weight (Mw) of 180,000.

Incidentally, the devolatilizing conditions of the vent type double-screw extruder were as follows:

barrel temperature: 220° C.
number of revolutions: 120 rpm
vent pressures
  rear vent 3: 670 mmHg
  fore vent 5a: 215 mmHg
  fore vent 5b: 20 mmHg
  fore vent 5c: 10 mmHg
amount of resin treated: 25 kg/hr
amount of ion-exchanged water injected: 0.25 kg/hr (at all of injection inlets 9a, 9b, and 9c)

EXAMPLE 2

Colorless transparent polymer pellets were obtained in the same way as of Example 1 except that 95 parts of styrene and 5 parts of 2-isopropenyl-2-oxazoline were replaced with 89.4 parts of styrene and 10.6 parts of 2-isopropenyl-2-oxazoline.

EXAMPLE 3

Colorless transparent polymer pellets were obtained in the same way as of Example 1 except that 95 parts of styrene and 5 parts of 2-isopropenyl-2-oxazoline were replaced with 78.9 parts of styrene and 21.1 parts of 2-isopropenyl-2-oxazoline.

EXAMPLE 4

Colorless transparent polymer pellets were obtained in the same way as of Example 2 except that the barrel temperature was lowered to 200° C.

COMPARATIVE EXAMPLE 1

Colorless transparent polymer pellets were obtained in the same way as of Example 1 except that none of ion-exchanged water was injected.

COMPARATIVE EXAMPLE 2

Colorless transparent polymer pellets were obtained in the same way as of Comparative Example 1 except that the barrel temperature was changed to 240° C.

COMPARATIVE EXAMPLE 3

Colorless transparent polymer pellets were obtained in the same way as of Comparative Example 1 except that the number of revolutions was changed to 160 rpm.

As to the pellets as obtained in Examples 1 to 4 and Comparative Examples 1 to 3, the respective amounts (ppm) of residual volatile components (styrene, toluene, 2-isopropenyl-2-oxazoline) and the content (mol %) of the cyclic imino ether group containing monomer unit in the polymer are shown in Table 1 along with the devolatilizing conditions.

It would be understood that the amount of the residue is smaller with regard to all the volatile components, particularly, 2-isopropenyl-2-oxazoline, in Examples 1 to 4, where ion-exchanged water was injected, than in Comparative Example 1, where none of ion-exchanged water was injected.

In addition, the barrel temperature and the number of revolutions were higher in Comparative Examples 2 and 3 respectively than in Comparative Example 1. Such operations of the devolatilizing conditions may be able to reduce the amount of residual volatile components to some extent, but processes other than the present invention process are entirely insufficient with regard to the removal particularly of the residue of the cyclic imino ether group containing monomer. That is to say, the reduction ratios of the amounts of residual 2-isopropenyl-2-oxazoline in Comparative Examples 2 and 3 to the amount of residual 2-isopropenyl-2-oxazoline in Comparative Example 1 are merely almost the same as those of residual styrene and toluene. In contrast, comparing Example 1 with Comparative Example 1, the respective amounts of residual styrene and toluene in Example 1 were reduced to about half of those in Comparative Example 1, but the amount of residual 2-isopropenyl-2-oxazoline in Example 1 was reduced to not more than ¼ of that in Comparative Example 1. From this, it would be understood that the process of the present invention is particularly effective for removing the residue of the cyclic imino ether group containing monomer. Incidentally, under the GC measurement conditions in the above Examples and Comparative Examples, a predetermined amount of peak as derived from 2-isopropenyl-2-oxazoline could be detected from the volatile components of the polymers as obtained in Example 4 and Comparative Examples 1 to 3.

TABLE 1

| | Cyclic imino ether group containing monomer unit (mol %) | Amount of residual volatile components (ppm) | | | Devolatilizing conditions | | |
|---|---|---|---|---|---|---|---|
| | | Styrene | Toluene | 2-Isopropenyl-2-oxazoline | Injection of water | Barrel temperature (° C.) | Number of revolutions (rpm) |
| Example 1 | 5.7 | 200 | 200 | 5> (Not detected) | Done | 220 | 120 |
| Example 2 | 10 | 190 | 200 | 5> (Not detected) | Done | 220 | 120 |
| Example 3 | 20 | 190 | 200 | 5> (Not detected) | Done | 220 | 120 |
| Example 4 | 10 | 300 | 280 | 10 | Done | 200 | 120 |
| Comparative Example 1 | 5.7 | 400 | 480 | 22 | No | 220 | 120 |
| Comparative Example 2 | 5.7 | 290 | 350 | 17 | No | 240 | 120 |
| Comparative Example 3 | 5.7 | 280 | 320 | 17 | No | 220 | 160 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A cyclic imino ether group containing polymer, which is derived from a process including the step of polymerizing a monomer component including a cyclic imino ether group containing monomer of which the nitrogen and oxygen atoms form part of one ring, and which comprises:
    a) a cyclic imino ether group containing monomer unit of which the nitrogen and oxygen atoms form part of one ring; and;
    b) wherein the cyclic imino ether group containing monomer unit is present in the polymer in the ratio of not less than 0.1 mol %; and
    c) wherein the amount of the cyclic imino ether group containing monomer remaining in the polymer is not more than 15 ppm.

2. A production process for a cyclic imino ether group containing polymer, comprising the steps of:
    a) radical-polymerizing a monomer component including a cyclic imino ether group containing monomer of which the nitrogen and oxygen atoms form part of one ring to obtain a cyclic imino ether group containing polymer having a cyclic imino ether group containing monomer unit of which the nitrogen and oxygen atoms form part of one ring;
    b) and devolatilizing the resultant polymer by vacuum heating treatment to remove volatile components from the polymer, wherein the process further comprises the step of adding a compound, reactable with the cyclic imino ether group, to the polymer in the devolatilizing step.

3. A production process according to claim 2, wherein the compound reactable with the cyclic imino ether group is water.

4. A cyclic imino ether group containing polymer, which is derived from a process including the step of polymerizing a monomer component including a cyclic imino ether group containing monomer, and which comprises:
    a) a cyclic imino ether group containing monomer unit, wherein the monomer of the cyclic imino ether group containing monomer unit has the formula (1) below:

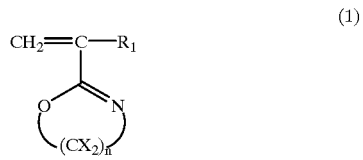

(1)

wherein: $R_1$ denotes a hydrogen atom or an alkyl group;
X independently denotes a hydrogen atom or a hydrocarbon group with not more than 18 carbon atoms; and
n denotes an integer of 1 to 5;
    b) wherein the cyclic imino ether group containing monomer unit is present in the polymer in the ratio of not less than 0.1 mol %; and
    c) wherein the amount of the cyclic imino ether group containing monomer remaining in the polymer is not more than 15 ppm.

* * * * *